J. K. SODEN.
ELECTRIC TABLE HEATER.
APPLICATION FILED JUNE 21, 1918.
1,332,526.
Patented Mar. 2, 1920.
2 SHEETS—SHEET 1.
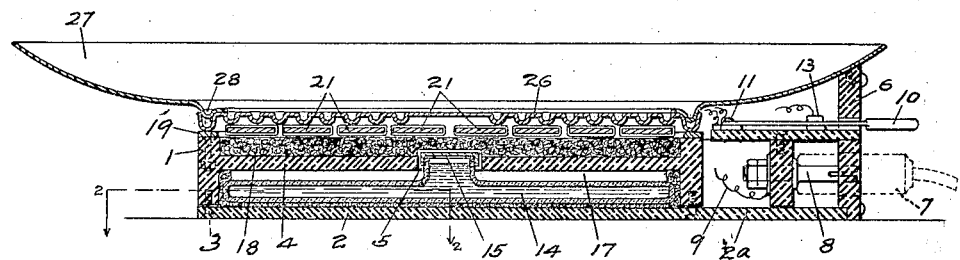
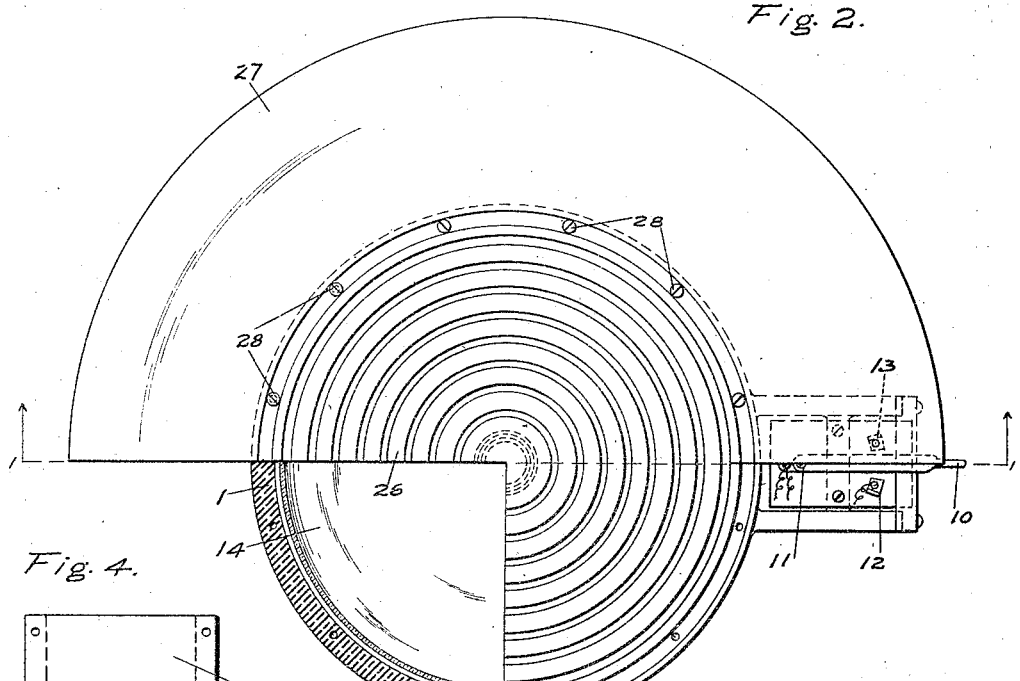
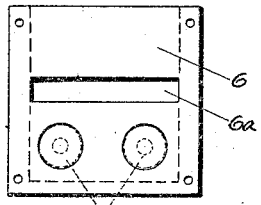
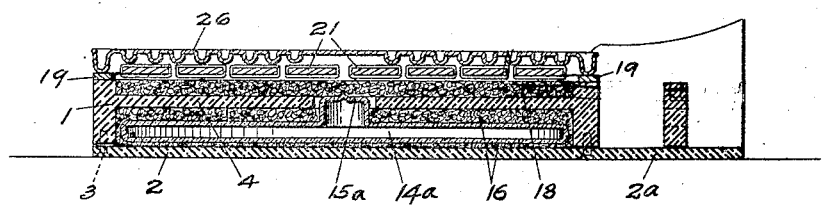
JOHN K. SODEN,
Inventor,
Attys J. K. SODEN.
ELECTRIC TABLE HEATER.
APPLICATION FILED JUNE 21, 1918.
1,332,526.
Patented Mar. 2, 1920.
2 SHEETS—SHEET 2.
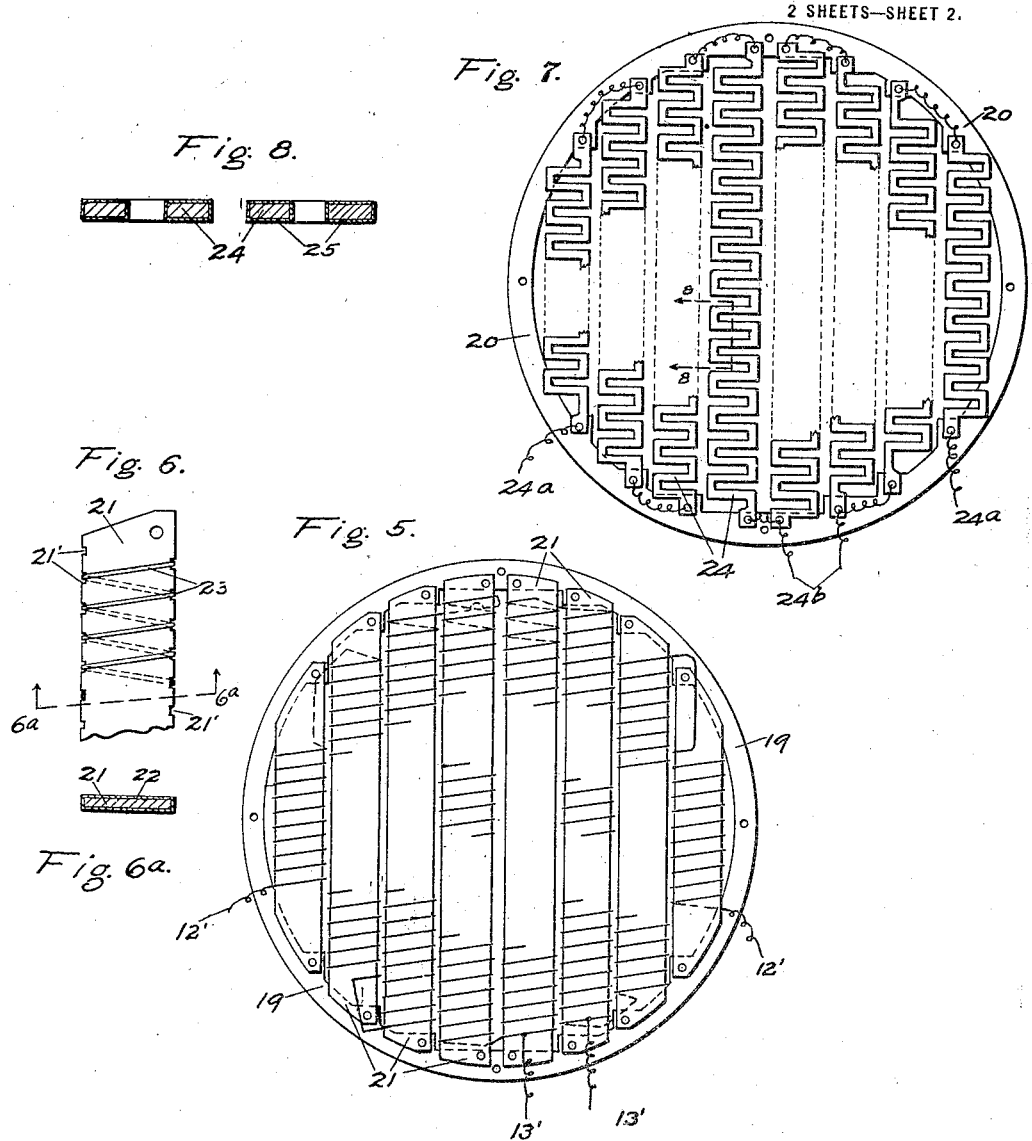
JOHN K. SODEN,
Inventor.
Attys

UNITED STATES PATENT OFFICE.

JOHN K. SODEN, OF PORTLAND, OREGON.

ELECTRIC TABLE-HEATER.

1,332,526.  Specification of Letters Patent.  Patented Mar. 2, 1920.

Application filed June 21, 1918. Serial No. 241,133.

*To all whom it may concern:*

Be it known that I, JOHN K. SODEN, a citizen of the United States, residing in the city of Portland, county of Multnomah, and State of Oregon, have invented certain new and useful Improvements in Electric Table-Heaters, of which the following is a specification.

My invention relates to electric table heaters, and more particularly to a device adapted to be placed on a dining table or other support, for the purpose of heating food containers and for keeping the same hot while in use.

Among the salient objects of my invention are,—to provide an improved device of the character referred to which is thoroughly insulated and adapted to be placed upon a table surface or other finished support without danger of damaging the same because of the heat generated therein; to provide in a device of the character referred to an improved heating element, so constructed and arranged that the heat generated thereby will be conserved and communicated to the article or container to be heated, thereby giving a maximum efficiency, with little or no loss of heat by radiation or conduction; to provide a device of the character referred to which can be readily adapted to different uses and to developing different degrees of heat, as may be required for originally heating the object placed thereon, or therein, or for merely keeping it warm after it has been heated by other means.

Other objects and advantages of my invention will be apparent from the following description of one practical embodiment thereof, taken in connection with the accompanying sheets of drawings, in which,—

Figure 1 is a vertical sectional view thereof, taken on line 1—1, of Fig. 2;

Fig. 2 is a top plan view thereof, with parts shown in horizontal sectional view, as on line 2—2, of Fig. 1;

Fig. 3 is a partial sectional view showing a slightly modified construction;

Fig. 4 is an end view of a switch extension;

Fig. 5 is a plan view of a heating disk;

Fig. 6 is an enlarged detail view of one of the heating bars;

Fig. 6$^a$ is a cross sectional view therethrough, taken on line 6$^a$—6$^a$, of Fig. 6;

Fig. 7 is a plan view of a modified form of heating bar; and

Fig. 8 is a detail sectional view thereof, taken on line 8—8, of Fig. 7.

Referring now more in detail to the drawings, my invention as here shown for purposes of illustration, comprises a body 1, provided with a base 2, shown secured thereto by means of screws 3. This body and its base are made of any suitable insulating and non-conducting material, such as vulcanized fiber, or bakelite. The body, as here shown, is provided with an intermediate partition 4, having an opening 5 through the center thereof. Said base 2 has an extension 2$^a$ at one side thereof and is provided with a box-like structure 6, shown in end view in Fig. 4, and having an opening 6$^a$ therein for a switch, hereinafter again referred to. In this extension the electric connections are made, as by means of connection plugs 7—7, shown in dotted lines and also shown in end view in Fig. 4. These plugs may be connected with any suitable source of electric energy, such as service outlets in homes. The plugs 7, 7, fit on to terminal pins, 8, with which are connected the wires, 9. A switch member 10, pivoted at 11, is movably mounted so as to be moved into contact with two terminal members 12 and 13. When said switch is between said terminal members, it is in neutral position, and when moved to terminal 12, the connections are such as to give a lower heat, and when moved to terminal 13, the connections are such as to give a higher degree of heat, as will be understood in the art.

Mounted in the body, below the partition 4, is a container 14, provided with a removable top 15. In Fig. 1 this container is filled with water, or other suitable heat absorbing and retaining fluid. In Fig. 3 the container is designated as 14$^a$ and is sealed at 15ᵃ. In this form said member constitutes a vacuum for the purpose of insulation, and is shown as surrounded with a loose insulating material, 16, such as asbestos felt, mineral wool, or other suitable non-conducting material adapted to conserve the heat generated by the heating element, hereinafter described.

In Fig. 1 a dead air space 17 is left above the container 14, as clearly shown. Above the partition 4, in both forms of the invention here shown, is also provided loose insulating material, 18, as before referred to. Arranged above the insulating material is a heating element, two forms of which are shown in Figs. 5 and 7, and as here shown comprises ring members, 19 and 20, which may be secured to the upper edge of the body 1, as indicated in Figs. 1 and 3. Across the ring member 16 are arranged, in spaced relationship, bars 21, 21. These bars are here shown as made of metal, covered with porcelain enamel, 22, as indicated in the sectional view, Fig. 6ᵃ. The enamel is thoroughly baked thereon, under a high degree of heat so as to be unaffected by the heat generated by the resistance coils placed therearound. These bars are formed with notches 21′, to receive a winding of resistance wire 23, wound thereupon as clearly indicated in Figs. 5 and 6.

In Fig. 7, I have shown a combination bar and resistance conductor, 24. These bars are stamped out of suitable metal for resistance conductors, substantially in the manner shown, and are also covered with porcelain enamel, 25, as will be clear from Fig. 8, which is a sectional view taken on line 8—8, of Fig. 7. The electric connections are with these bars, as at 24ᵃ and 24ᵇ, the current passing through the covered metal of which the bars are made and the heat being generated therein.

Mounted above the heating element, is a corrugated plate or support, 26, here shown as extending out over the ring 19 of the heating element. Mounted around this plate or supporting member is an annular dish-receiving member, 27, here shown to be of a form adapted to receive and hold a plate or platter (not shown), which can be set therein and removed therefrom, just as it is placed upon the table in front of the person who is to use the same. The annular dish holder here shown is secured to the corrugated plate and body of the heater by means of small screws 28. The corrugated plate not only gives increased heat radiating surface, but holds a plate set thereon from sliding, as the bottom rim of the plate can fit into one of the grooves in such a way as will hold it from slipping. It will be understood, of course, that any container can be set upon the corrugated heating plate, and that it will be found convenient to set a coffee, or tea pot thereon, or any other dish or utensil which can be placed within the member 27, and if the member 27 is removed, as it can be, then the heater can be used to receive any article having a flat bottom. The corrugation of the heating plate, which is also covered with baked porcelain enamel, permits of certain expansion and contraction under heat without injury to the enamel.

I am aware that changes can be made in the details of my invention as here shown without departing from the spirit thereof, and I do not, therefore, limit the invention to the showing here made, except as I may be limited by the hereto appended claims.

I claim:

1. In a device of the character referred to, a body, a container mounted therein of disk like form and closed, whereby to act as a heat conserver, electrical heating elements mounted above said container and insulated therefrom, and a heating plate of corrugated form seated on said heating elements, substantially as described.

2. In a device of the character referred to, a body, a container of disk-like form mounted therein and closed with a fluid therein, electrical heating elements mounted above said container and insulated therefrom, a heating plate of corrugated form on said heating elements, an annular plate supporting rim mounted thereon, and means for controlling the heat thereto, substantially as described.

3. In an electric table heater, a body, electrically heated bars mounted therein, with means for connecting electric circuits thereto for heating the same, a corrugated heating plate mounted thereon, and an annular dish holding member mounted around said heating plate, substantially as shown and described.

4. In a device of the character referred to, a body, enamel covered, electrically heated elements for heating said device, means for insulating said heated elements from the inner side of said body, a heating plate of corrugated form above said heated elements, to be heated thereby, and means for holding a dish or the like on said heating plate.

5. In a device of the character referred to, a body having a closed chamber in its lower portion and heating elements in its upper portion, said heating elements comprising suitable strips covered with baked enamel, resistance wire on said strips, and a receptacle supported in said body over said heating elements and adapted to receive articles to be kept warm, substantially as described.

6. In a device of the character referred to, a body having a closed chamber in its lower portion with a heat conserving function, a plurality of heating elements mounted in said body above said closed chamber, said heating elements comprising strips of material across said body in spaced relationship to each other and provided with electrical connections for heating the same, and a receiving element mounted above said heating elements and adapted to receive the matter to be heated, substantially as described.

Signed at Portland, Multnomah county, Oregon, this 7th day of June, 1918.

JOHN K. SODEN.

In presence of—
W. T. SLATER,
WM. R. LITZENBERG.